Figure 1:
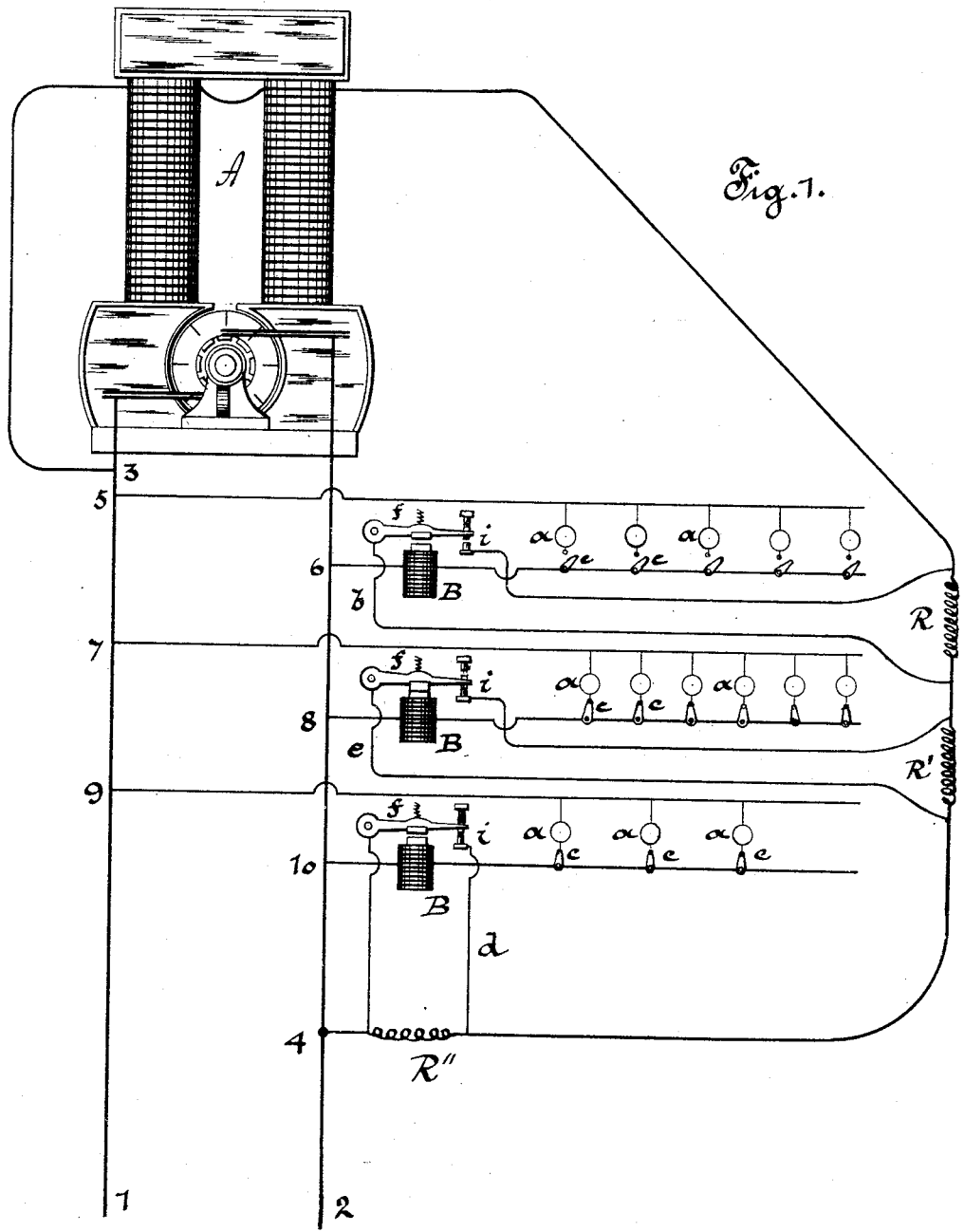

(No Model.) 2 Sheets—Sheet 1.

T. A. EDISON.
REGULATOR FOR DYNAMO ELECTRIC MACHINES.

No. 264,669. Patented Sept. 19, 1882.

WITNESSES:
Thomas E. Birch.
S. D. Mott

INVENTOR:
T. A. Edison
BY Rich'd N. Dyer,
ATTORNEY.

(No Model.)  2 Sheets—Sheet 2.
T. A. EDISON.
REGULATOR FOR DYNAMO ELECTRIC MACHINES.
No. 264,669. Patented Sept. 19, 1882.
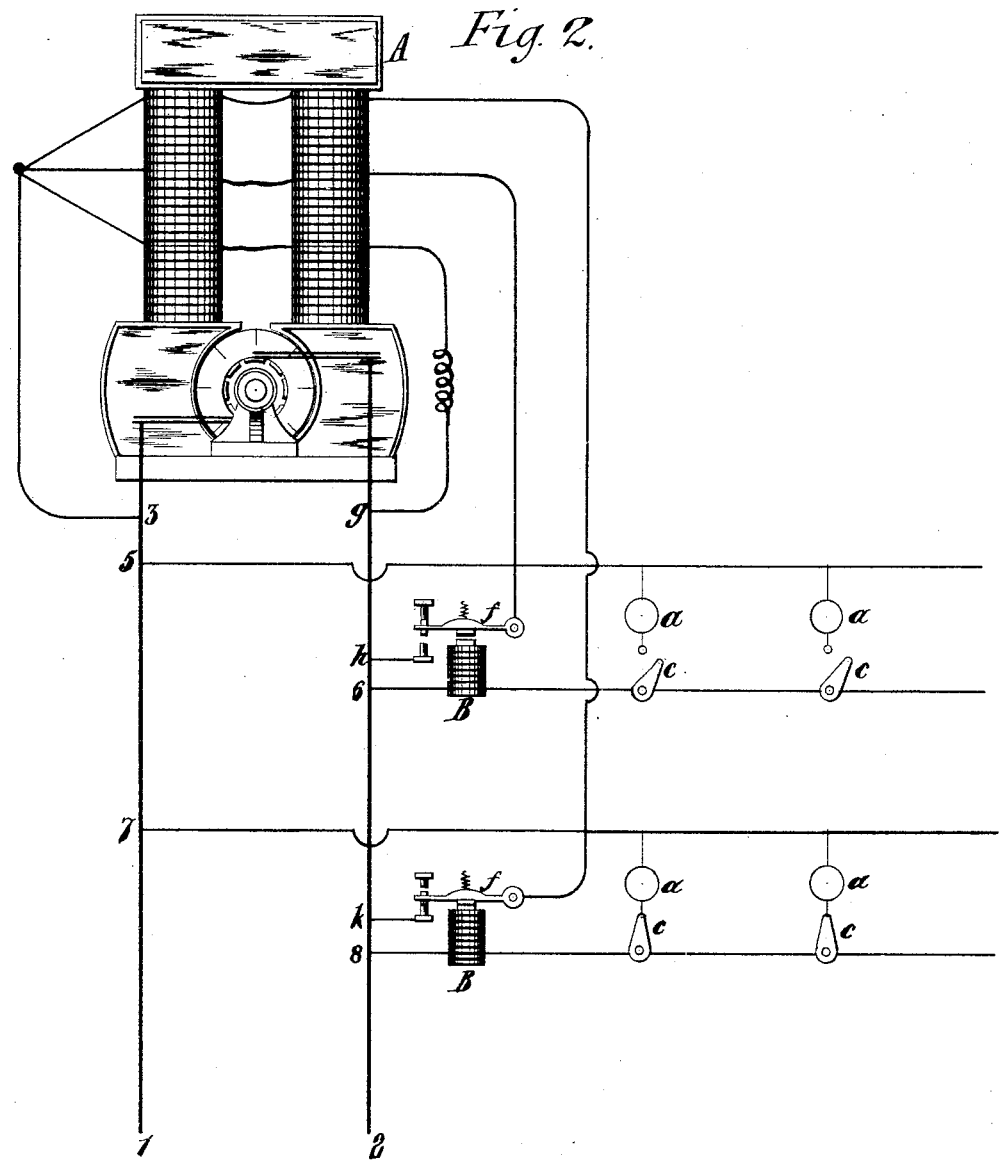
WITNESSES:
Thomas E. Birch.
O. D. Mott
INVENTOR:
T. A. Edison
BY Rich'd N. Dyer,
ATTORNEY.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 264,669, dated September 19, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Means for Regulating the Generative Capacity of Dynamo or Magneto Electric Machines, (Case No. 395;) and I do hereby declare that the following is a full and exact description of the same, reference being had to the accompanying drawings, and to the letters of reference marked thereon.

The object of this invention is to furnish simple and efficient means whereby the addition or removal of translating devices in a multiple-arc system of electrical distribution will automatically vary the current energizing the field-magnet of the dynamo or magneto electric machine supplying such system. From the main conductors which lead from the machine multiple-arc circuits are run, across which are placed lamps, also in multiple arc. Separate groups of translating devices are thus formed. In each of the multiple-arc circuits from the mains is placed an electro-magnet, provided with a pivoted armature-lever retracted by a spring, which acts to open and close a circuit, which, by its closure, causes more current to pass through the field-magnet, such circuit being either a shunt around a resistance in the field-circuit or a division of the field-circuit, including a portion of the coils of the field-magnet.

In the annexed drawings, Figure 1 is a diagram showing the arrangement in which the magnet cuts out resistance from the field, and Fig. 2 a diagram showing that in which additional circuits are closed through the field-coils.

While the invention is here shown as applied to a dynamo-electric machine, it is evident that it is equally applicable to magneto-electric machines in which the field-circuit is supplied with current from an external source, such as another magneto or dynamo machine or a battery.

A is a dynamo-electric machine, and 1 2 are the main conductors leading therefrom.

3 4 is the multiple-arc circuit energizing the field magnet of the machine.

5 6, 7 8, and 9 10 are multiple-arc circuits from the main line, containing lamps or other translating devices, *a a*, each of which is provided with a circuit-controller, *c*.

R R′ R″ are resistances placed in the circuit 3 4. Shunt-circuits *b d e* are formed around these resistances. A part of each shunt-circuit consists of an armature-lever, *f*, controlled by an electro-magnet, B, placed in the multiple-arc circuit containing lamps *a*. It is evident that when these shunt-circuits are all closed at *i i* none of the resistances will be in the field-circuit, and when these shunts are open all the resistances R R′ R″ will be in circuit. All the lamp-circuits in the multiple-arc circuit 5 6 being open, no current flows through the magnet of that circuit, and the shunt-circuit *b* is therefore open at *i*, so that the resistance R is in the field-circuit; but in the circuit 7 8 a number of lamps are on, and sufficient current passes through the circuit to cause the armature *f* to be attracted, closing the shunt *e*, thus short-circuiting the resistance R′. While in the circuit 9 10, though a few lamps are on, yet they are not enough to cause the passage of sufficient current to energize the magnet B enough to close the shunt *d* and cut out the resistance R″.

In Fig. 2 the coils of the field-magnet of the dynamo-electric machine A are divided into a number of parts or bobbins, each of which is included in a division of a multiple-arc circuit from the main conductors 1 2. One of these divisions, 3 *g*, returns directly to the main conductor 2, being intended as a circuit for primarily energizing the field, and is made of high resistance, either by the fineness of its wire or by a resistance placed in it, so that only a small amount of current will pass through it. Each of the other divisions, 3 *h* and 3 *k*, of the field-circuit includes an armature-lever, *f*, which is actuated, according to the current flowing through its magnet B, to make or break the circuit in which it is placed. Thus, when a circuit through a magnet, B, is closed by the addition of a sufficient number of translating devices it attracts its armature-lever and closes a circuit through a greater portion of the field-magnet coils.

What I claim is—

1. The combination, with a dynamo or magneto electric machine and groups of translating devices arranged in multiple arc upon multiple-arc circuits from the main conductors of such machine, of means other than the circuit-connections in connection with each group for regulating the current energizing the field-magnet of the machine, acting automatically upon the addition or removal of translating devices in the group, substantially as set forth.

2. The combination, with a dynamo or magneto electric machine and groups of translating devices, arranged as described, of means in connection with each group, operated automatically by the current, whereby the addition or removal of translating devices in the group causes the closing or opening of a circuit, whose closure or opening varies the current energizing the field-magnet of the generator, substantially as set forth.

3. The combination, with a series of resistances in the field-circuit of a dynamo or magneto electric machine and a number of groups of translating devices, arranged as described, of means in connection with each group, operated automatically by the addition or removal of translating devices in such group, for throwing one of said series of resistance in or out of circuit, substantially as set forth.

4. The combination, with a dynamo or magneto electric machine and groups of translating devices, arranged as described, of a magnet energized by the current supplying each group and provided with an armature-lever whose motion opens or closes a circuit to vary the current energizing the field-magnets of said machine, substantially as set forth.

5. The combination of the field-magnet of a dynamo-electric machine placed in a multiple-arc circuit, the armature of said machine placed in another multiple-arc circuit, groups of translating devices placed in other multiple-arc circuits, said multiple-arc circuits being all derived from the same main conductors, and means in connection with each group for regulating the current energizing the field-magnet of the machine, acting automatically upon the addition or removal of translating devices in the group, substantially as set forth.

This specification signed and witnessed this 10th day of February, 1882.

THOMAS A. EDISON.

Witnesses:
H. W. SEELY,
WM. H. MEADOWCROFT.